United States Patent
Millsap et al.

(10) Patent No.: US 11,639,195 B2
(45) Date of Patent: May 2, 2023

(54) LANE CHANGE ASSISTANT

(71) Applicants: Steering Solutions IP Holding Corporation, Auburn Hills, MI (US); Continental Automotive Systems, Inc., Auburn Hills, MI (US)

(72) Inventors: Scott A. Millsap, Grand Blanc, MI (US); Joseph A. Labarbera, Auburn Hills, MI (US)

(73) Assignees: Steering Solutions IP Holding Corporation, Auburn Hills, MI (US); Continental Automotive Systems Inc., Auburn Hills, MI (US)

( * ) Notice: Subject to any disclaimer, the term of this patent is extended or adjusted under 35 U.S.C. 154(b) by 172 days.

(21) Appl. No.: 16/747,139

(22) Filed: Jan. 20, 2020

(65) Prior Publication Data

US 2020/0269920 A1   Aug. 27, 2020

Related U.S. Application Data

(60) Provisional application No. 62/811,166, filed on Feb. 27, 2019.

(51) Int. Cl.
*B62D 15/02* (2006.01)
*B60W 60/00* (2020.01)

(52) U.S. Cl.
CPC ..... *B62D 15/0255* (2013.01); *B60W 60/0054* (2020.02); *B62D 15/021* (2013.01); *B62D 15/0205* (2013.01); *B60W 2422/50* (2013.01); *B60W 2540/18* (2013.01)

(58) Field of Classification Search
CPC ........... B62D 15/0255; B62D 15/0205; B62D 15/021; B60W 60/0054; B60W 2422/50; B60W 2540/18
See application file for complete search history.

(56) References Cited

U.S. PATENT DOCUMENTS

| | | | | |
|---|---|---|---|---|
| 2004/0054452 A1* | 3/2004 | Bjorkman | ................ | A61B 5/18 701/31.4 |
| 2009/0132109 A1* | 5/2009 | Galley | ................ | B60K 28/066 701/31.4 |
| 2013/0002416 A1* | 1/2013 | Gazit | ................... | B62D 15/027 701/23 |
| 2014/0257628 A1* | 9/2014 | Lee | ...................... | B62D 5/0481 701/34.4 |
| 2017/0361853 A1* | 12/2017 | Nagy | ................... | B60W 10/20 |

* cited by examiner

*Primary Examiner* — Kenneth J Malkowski
*Assistant Examiner* — Andrew J Cromer
(74) *Attorney, Agent, or Firm* — Brooks Group, PLC

(57) ABSTRACT

A number of illustrative variations may include a method of communication between a driver and an autonomous steering system.

4 Claims, 3 Drawing Sheets

LANE CHANGE ASSISTANT

CROSS-REFERENCE TO RELATED APPLICATIONS

This application claims the benefit of U.S. Provisional Application Ser. No. 62/811,166 filed Feb. 27, 2019.

TECHNICAL FIELD

The field to which the disclosure generally relates to includes steering systems.

BACKGROUND

Vehicles typically include steering systems.

SUMMARY OF ILLUSTRATIVE VARIATIONS

A number of illustrative variations may include a method of communication between a driver and an autonomous steering system.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

Figure 1:
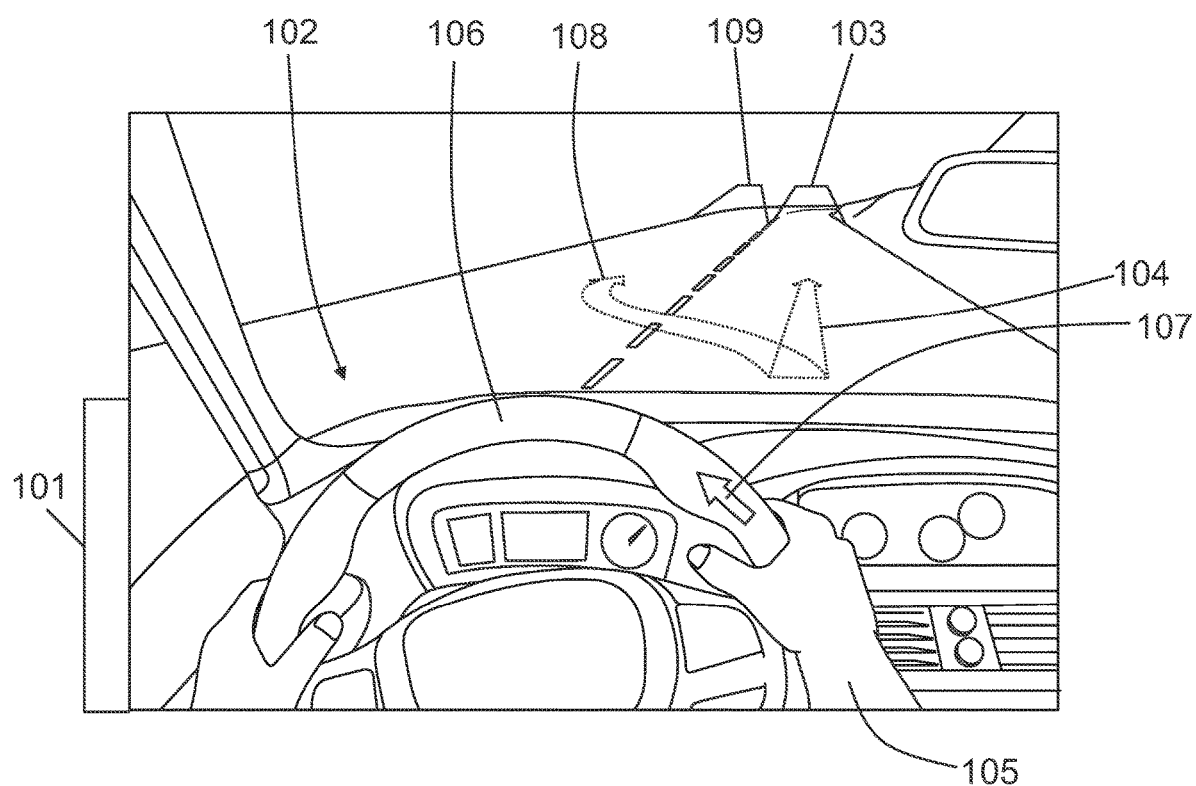
FIG. 1 depicts an illustrative variation in which a driver has indicated a desire to change the current lane of travel to the autonomous steering system via a steering interface.

The following description of the variations is merely illustrative in nature and is in no way intended to limit the scope of the invention, its application, or uses.

In a number of illustrative variations, an autonomous steering system may comprise a number of logic modules intended to autonomously address a number of areas of control within the realm of vehicle steering and travel including but not limited to vehicle acceleration, vehicle braking, and lateral control of the vehicle. The logic for the modules of the autonomous steering system may account for non-autonomous driver input.

In a number of illustrative variations, in order to foster a cooperative steering system, any number of sensors or cameras of an autonomous steering system may be configured to detect and identify steering input as driver input. The logic of the autonomous steering modules may also be configured to regard input identified as driver input as a steering request that may be queued and executed by the autonomous steering system at some point in the future.

In a number of illustrative variations, a vehicle may be equipped with a steering system that allows a driver to change the vehicle's direction or divert it from a path that it may be traveling in. The vehicle's steering system may also be autonomous in that the vehicle may steer itself toward a predetermined location that has been generated by it or communicated to it without assistance or interference from a driver. Such a vehicle may have a lane-keeping system that allows the vehicle to follow traffic and stay within a particular lane of traffic on any given road that the vehicle may follow on the path to such a predetermined location. The vehicle may have an obstacle avoidance system that allows the vehicle to sense objects in its path and avoid them. In some cases, the driver of the vehicle may wish to induce the autonomous steering system to cause the vehicle to change lanes by use of a steering interface, without the use of hardware external to the steering interface or hardware dedicated for such a lane change. In such a case, the driver may take control of the driver-side steering interface and manipulate it in a particular manner that indicates to the autonomous steering system that a lane change is desired, such as but not limited to a quick yet low amplitude manipulation of the steering interface in a manner consistent with the direction of the desired lane change followed by a releasing by the driver of the steering interface. In such a case, haptic feedback indicating the autonomous steering system's acknowledgement of the lane change request as well as but not necessarily any normal steering forces may be communicated to the driver via any interface through which the driver may use to communicate a driver steering intent to the steering system.

In a number of illustrative variations, an autonomous steering system may be keeping a vehicle centered in a particular lane. In some illustrative variations, this autonomous lane-keeping may occur during highway driving. In some such cases, the autonomous steering system may be functioning in a lane-keeping capacity alone with no other autonomous steering functions enabled, or the autonomous steering system may be functioning in a fully autonomous driving mode involving steering in which the driver does not need to intervene at all to reach a predetermined destination, or any other level of autonomous driving that includes a lane-keeping function. While the autonomous steering system is lane keeping, in some illustrative variations, driver input may be ignored by the autonomous steering system unless the driver input meets at least one criteria such as but not limited to some mechanical, temporal, audial, electrical, optical, or digital aspect of steering exceeding, meeting, or staying below a threshold or conforming to a specified gesture, speech, movement, or other such driver behavior specified to, by, or within the autonomous steering system. In some such cases the driver may wish to cause the vehicle to change the lane in which it is driving and may indicate to the autonomous steering system that a lane change is desired by the driver without a need for the driver to take real-time control of the vehicle for any period of time. The driver may submit this request to the autonomous steering system by interacting with the steering interface in a predetermined manner that the autonomous steering system is calibrated to detect and interpret as a driver input request to the autonomous steering system to perform a discrete autonomous steering maneuver. A vehicle component may then be utilized to indicate to the driver that the autonomous steering system acknowledges the request by delivering driver feedback such as but not limited to visual feedback, audial feedback, haptic feedback, or any other known form of user feedback, and handle the request when appropriate.

In a number of illustrative variations, if the driver attempts to intervene or cooperate in steering via the steering interface, the steering system may attempt to oppose the driver input by generating opposing autonomous input to manipulate the steering interface in an opposing manner to the driver input. In some such cases, the steering system may set a threshold for torque or force that it may apply to the steering interface in opposition to the driver. In some such cases, if the driver overpowers the torque or force resulting from the opposing autonomous input, the autonomous steering system may relinquish full control of the steering system to the driver.

In a number of illustrative variations, the autonomous steering system may be configured to monitor for torque input to the steering system by the driver via a steering interface. In some such cases, the autonomous steering system may be monitoring a threshold torque input value to be exceeded by driver input for a predetermined amount of time. In such a case, if the steering system detects that the torque input threshold has been exceeded by driver input for the predetermined amount of time, the autonomous steering system may relinquish full control of the steering system to the driver.

In a number of illustrative variations, there may exist steering interface manipulation thresholds that indicate to the autonomous steering system that a driver intends to communicate a particular steering request to the autonomous steering system. As a non-limiting example, a driver may hold a steering wheel at an angle between an upper and lower threshold angle, or may apply a particular amount of torque to a steering wheel at a predetermined amplitude for a predetermined amount of time before the intended particular steering request is detected by or submitted to the autonomous steering system and the driver receives feedback indicating that the request was detected or submitted, and acknowledged.

In a number of illustrative variations, a large torque resistance may be autonomously applied to the steering interface around the moment that a driver request is acknowledged. This torque resistance may act as a stop or a recognizable resistance to a driver's manipulation of the steering interface as a means of signaling to the driver intuitively that no more torque no longer needs to be applied by the driver to the steering interface or that the steering interface can be released or disengaged by the driver because the present driver input has been received by the autonomous steering system.

In a number of illustrative variations, a torque force may be autonomously applied to the steering interface around the moment that a driver request is acknowledged. This torque force may act as a counter-steering force to a driver's manipulation of the steering interface as a means of signaling to the driver intuitively that the steering interface is returning to a normal position or state because the present driver input has been detected by or submitted to and acknowledged by the autonomous steering system.

In a number of illustrative variations, forces respondent to, involved in, or resulting from steering may be communicated to the driver via any interface used for steering as a form of force feedback that may be helpful to the driver in steering the vehicle. These forces may include but may not be limited to cornering force, centrifugal force or any other road forces or rack forces. These forces may be communicated to the driver even when the driver is manipulating at least one steering interface in an attempt to submit a request to the autonomous steering system for the autonomous steering system to autonomously perform the requested steering maneuver.

In a number of illustrative variations, a steering ratio is defined as the ratio describing a relationship between the affectation of a steering interface to the affectation of a steering device. As a non-limiting example, a steering ratio for a boat may be defined as the ratio relating how far a rudder of the boat turns in response to a rotation of a captain's wheel. As another non-limiting example, a steering ratio for an aircraft may be defined as a ratio relating how far an aileron of the aircraft raises or lowers in response to a turning of a pilot's control wheel. As yet another non-limiting example, a steering ratio for a wheeled vehicle may be defined as a ratio relating how far a vehicle's road wheels turn in response to a turning of the steering wheel.

In a number of illustrative variations, a vehicle may comprise a steering system may be of the steer-by-wire type wherein physical mechanisms do not mechanically communicate a manipulation of a steering interface to a manipulation of a steering device but wherein a manipulation of a steering interface such as but not limited to a turning of a steering wheel affects a manipulation of a steerable propulsion device such as but not limited to a turning of the road wheels via the communication of electronic devices such as but not limited to sensors, transceivers or electronically excited actuators. In some such illustrative variations the steering system may comprise a mode in which a turning of the steering wheel does not directly translate to a fixed-steering-ratio turning of the road wheels.

In a number of illustrative variations, a steering interface such as but not limited to a steering wheel, a trackball, a trackpad, a touchscreen, a joystick, a mouse, a smart pen, a directional pad, a slider control, a dial or any other analog or digital form of user input or any number and combination thereof may be available to a driver for manipulation for the purpose of steering but may not directly affect the steering in an immediate way or according to a fixed steering ratio. In a number of illustrative variations, an autonomous steering system may be operating in a mode in which a steering interface is not used to directly steer the vehicle but as a means of collecting driver input for the purpose of detecting discrete requests from the driver for the automated steering system to perform discrete driving or steering maneuvers when or where appropriate.

In a number of illustrative variations, voice may be used as a driver input to the autonomous steering system for control of the vehicle, such as but not limited to a request for a lane change or a request to park, or as a driving input, such as but not limited to a request to speed up or slow down. In such illustrative variations, recognition of voice commands by the autonomous steering system may be considered a steering interface.

In a number of illustrative variations, if a vehicle comprises a steer-by-wire steering system, it may be necessary for force feedback from steering to be simulated for the driver in order to deliver an intuitive, semi-autonomous steering experience for the driver. If a vehicle comprising a steer-by-wire steering system comprises fully autonomous steering or semi-autonomous steering that allows driver cooperation or intervention, the steering system may simulate feedback from steering on any interface by which the driver may steer the vehicle. As a non-limiting example, when engaged in fully autonomous steering, the vehicle may automatically rotate a vehicle's steering wheel in conjunction with the autonomous steering system turning the vehicle's road wheels such that a non-intervening or non-cooperating driver may associate the automatic turning of the vehicle's steering wheel with the turning of the vehicle's road wheels and intuit, surmise, or estimate a steering ratio. Thus, if the driver desires to cooperate or intervene in the automated steering, the driver may be less disoriented when attempting to commandeer a steering interface that seems to be unassociated or misaligned with the vehicle's steering device. In some such cases, the steering interface may be automatically manipulated by the autonomous steering system and simulate force feedback by use of electric or mechanical motors, actuators, magnets, or any other method known in the art.

In a number of illustrative variations, if the vehicle is steering autonomously, and the driver may attempt to cooperate or intervene in steering the vehicle. In some such cases the autonomous steering system may allow the driver to intervene or cooperate in steering the vehicle while also determining the amount or level of variance to the autonomous steering that the driver is applying. In such cases, the autonomous steering system may calculate the variation to the vehicle path as well and may continuously calculate a new vehicle paths as the driver intervenes such that if the driver stops intervening, the vehicle may begin autonomously steering according to one of the new vehicle paths.

In a number of illustrative variations, if the vehicle is steering autonomously and without driver intervention or cooperation, and the driver attempts to intervene or cooperate in steering, the autonomous steering system may determine that driver input should be ignored, and the autonomous steering system may ignore any attempt by the driver to steer and instead steer the vehicle in ignorance of the driver input. In some such variations, driving context may be a determining factor in whether the autonomous steering system ignores or accepts driver input. As a non-limiting example, in the case of a steer-by-wire system, in the event that the vehicle sensors and systems, or any other system informing the vehicle determines that a steering maneuver is mandatory for safety reasons, the autonomous steering system may perform the steering maneuver autonomously, regardless of driver input. In such a case, the steering system may still acknowledge any driver input by providing feedback to the driver that is indicative of the autonomous steering system's acknowledgement of the driver input and queue the driver input for execution at an appropriate time. As another non-limiting example of when the autonomous steering system may ignore driver input, an autonomous steering system may be calibrated to simply ignore all driver input or particular driver inputs under certain circumstances such as but not limited to when the vehicle is autonomously turning or autonomously driving through an intersection. As a non-limiting example, the autonomous steering system may be calibrated so that particular driver inputs that would normally result in the generation and submission of a lane change request to the autonomous steering system may be ignored during circumstances in which the steering system is in any other driving condition than driving forward with a straight-ahead bearing. Tolerances in such variations and examples may be tuned for more intuitive use as well. As a non-limiting example of such a tuned tolerance, the autonomous steering system may allow a lane change request when the direction of travel is not substantially straight-ahead under certain circumstances such as but not limited to as the vehicle is straightening out of a turning maneuver or is straightening back out from a lane change maneuver or autonomous dodge maneuver.

In a number of illustrative variations, queued driver input may be canceled by the driver or autonomously by the autonomous steering system. In some such variations, the driver may be notified that the request has been canceled by any of the aforementioned means of notification or by any other known means of notification. In some illustrative variations, cancellation of a queued request may be accomplished by manipulating the steering interface in an opposing manner to that which originally generated the queued request, or by selecting and canceling the queued request from a displayed list via an interface with an electronic display, or by use of a voice command, or any other known method of canceling a request.

In a number of illustrative variations, any queued and pending lane change request may be checked by the autonomous steering system against sensor readings, GPS data, traffic data, or any other useful data to determine whether a lane change is appropriate. As a non-limiting example, if a vehicle comprising an autonomous steering system is traveling in the middle lane of a road, highway, or street having three lanes grouped together and traveling in the same direction, and the driver of that vehicle submits to the autonomous system via a steering interface a request to make a lane change to the right, but that request is queued for later execution for any reason, and the road, highway or street narrows to two lanes, eliminating the right lane, the autonomous steering system may determine from sensor readings, GPS data, traffic data or any other data that the lane change is no longer appropriate, the autonomous steering system may autonomously cancel the request and notify the driver of such, or continue to keep the request queued for later execution.

In a number of illustrative variations, when any queued or input lane change request is determined to be appropriate by the autonomous steering system, the autonomous steering system may induce the vehicle to perform the requested lane change autonomously. In such a case, the autonomous vehicle may signal the intent to change lanes before or during the performance of the lane change by communicating this intent to other vehicles by means such as but not limited to lighting a turn signal lamp or communicating this intent to other vehicles or a central communication hub by telecommunications.

In a number of illustrative variations, "steering maneuver" may mean a lane change maneuver, a dodge maneuver, a parking maneuver, a passing maneuver, stopping maneuver, a standing maneuver, a turning maneuver, or any other known vehicle piloting maneuver.

In a number of illustrative variations, any number of logic modules may be created from the algorithms described herein. Such modules may be combined together or broken into smaller modules.

Referring now to FIG. 1, an illustrative variation is shown in which an autonomous steering system 101 is steering a vehicle 102 in a first lane 103 on a first path 104 when a driver 105 attempts to intervene by engaging the steering interface 106. In such a variation, the autonomous steering system 101 may determine that the driver's 105 intent is to indicate to the autonomous steering system 101 that the driver 105 wishes to change lanes from the first lane 103 to a second lane 109. The autonomous steering system 101 may acknowledge the driver's input 107 by causing the steering interface 106 to buzz or vibrate. The autonomous steering system 101 may queue the driver's input 107, give a level of priority such as but not limited to a low, medium, or high priority to the driver's 105 intent to travel in the second lane 109, and begin charting a second path 108 that assumes a lane change from the first lane 103 to the second lane 109. In some such variations, the autonomous steering system 101 may factor in the given priority to the queued driver input 107 when determining if a lane change is appropriate.

Figure 2:
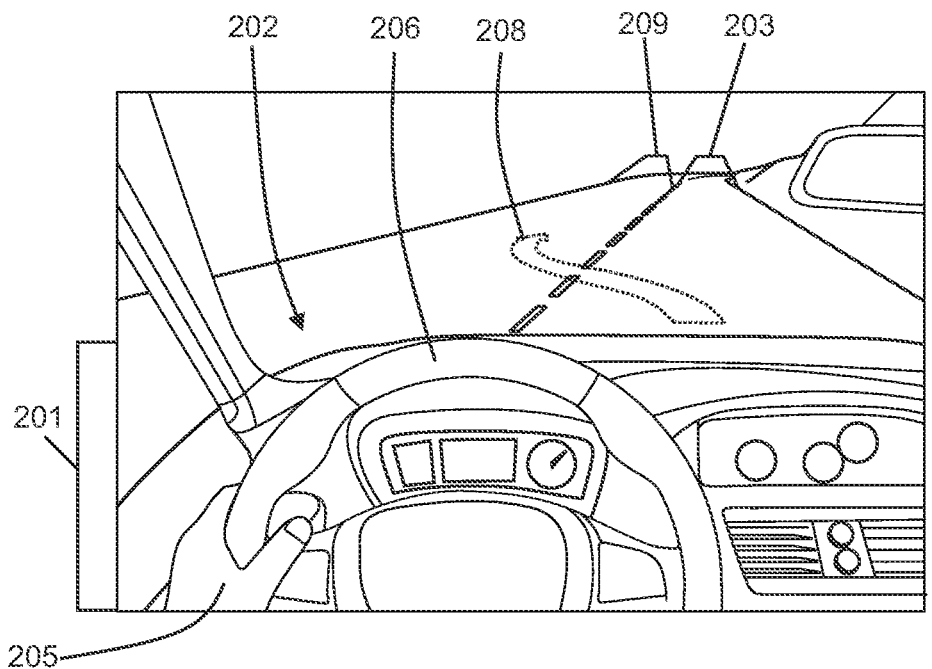
FIG. 2 depicts an illustrative variation in which an autonomous steering system for a vehicle has plotted a new path of travel within a new lane based upon a driver's lane change request.

Referring now to FIG. 2, an illustrative variation is shown in which a driver 205 has disengaged the steering interface 206 after indicating to the autonomous steering system 201 that the driver 205 desires to make a lane change from a first lane 203 to a second lane 209. In such a variation, the autonomous steering system 201 may utilize any number of sensors 310 to determine that the driver's 205 requested lane change is temporally and spatially appropriate and may induce the vehicle 202 to begin to follow previously charted a second path 208 that incorporates the desired lane change.

Figure 3:
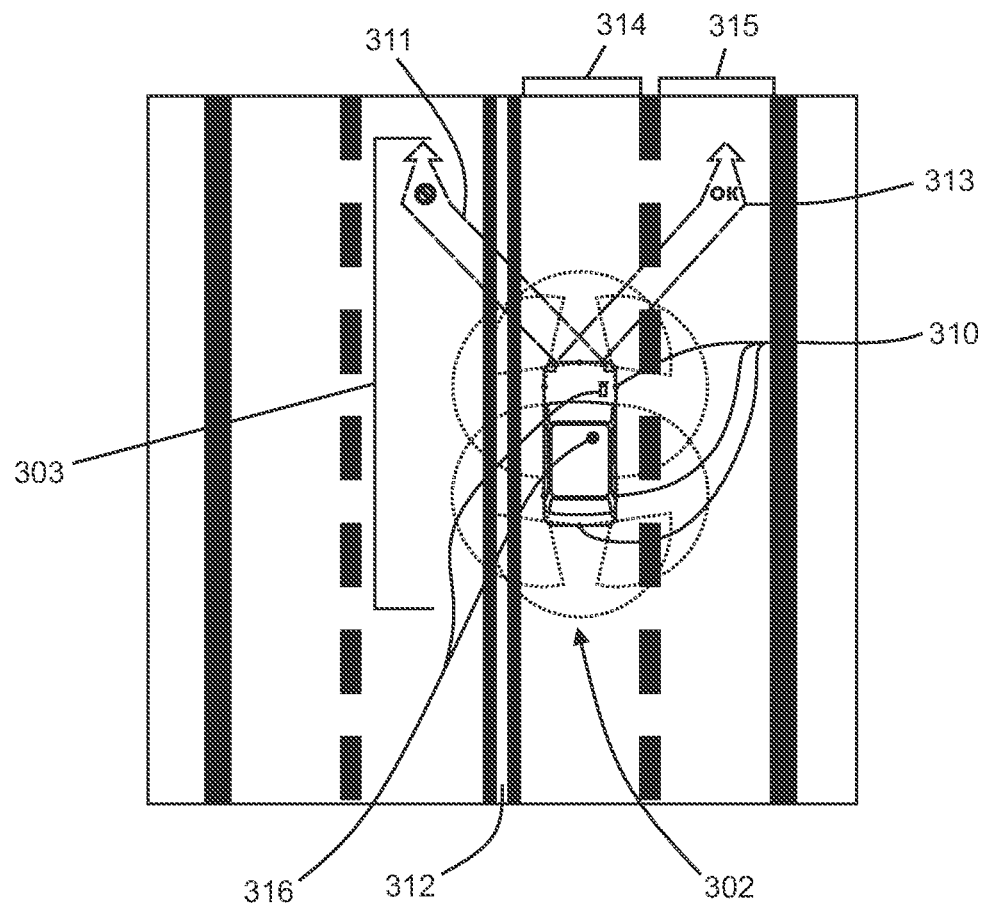
FIG. 3 depicts an illustrative variation in which a vehicle uses sensors or cameras to determine whether a lane change is possible or advisable.

Referring to FIG. 3, an illustrative variation is shown in which a vehicle 302 comprising an autonomous steering system 303 is using a number of sensors 310 or cameras 316 to determine whether a requested lane change is temporally and spatially appropriate. A first lane change request 311 may be determined to be inappropriate at a current or future moment because the autonomous steering system 303 has determined via the number of sensors 310 or cameras 316 that a lane change would involve a collision with a median barrier 312. A second lane change 313 request may be determined to be appropriate at a current or future moment because the lane change involves a change from a first demarked lane of traffic 314 to a second demarked lane of traffic 315 and would not involve a collision.

Figure 4:
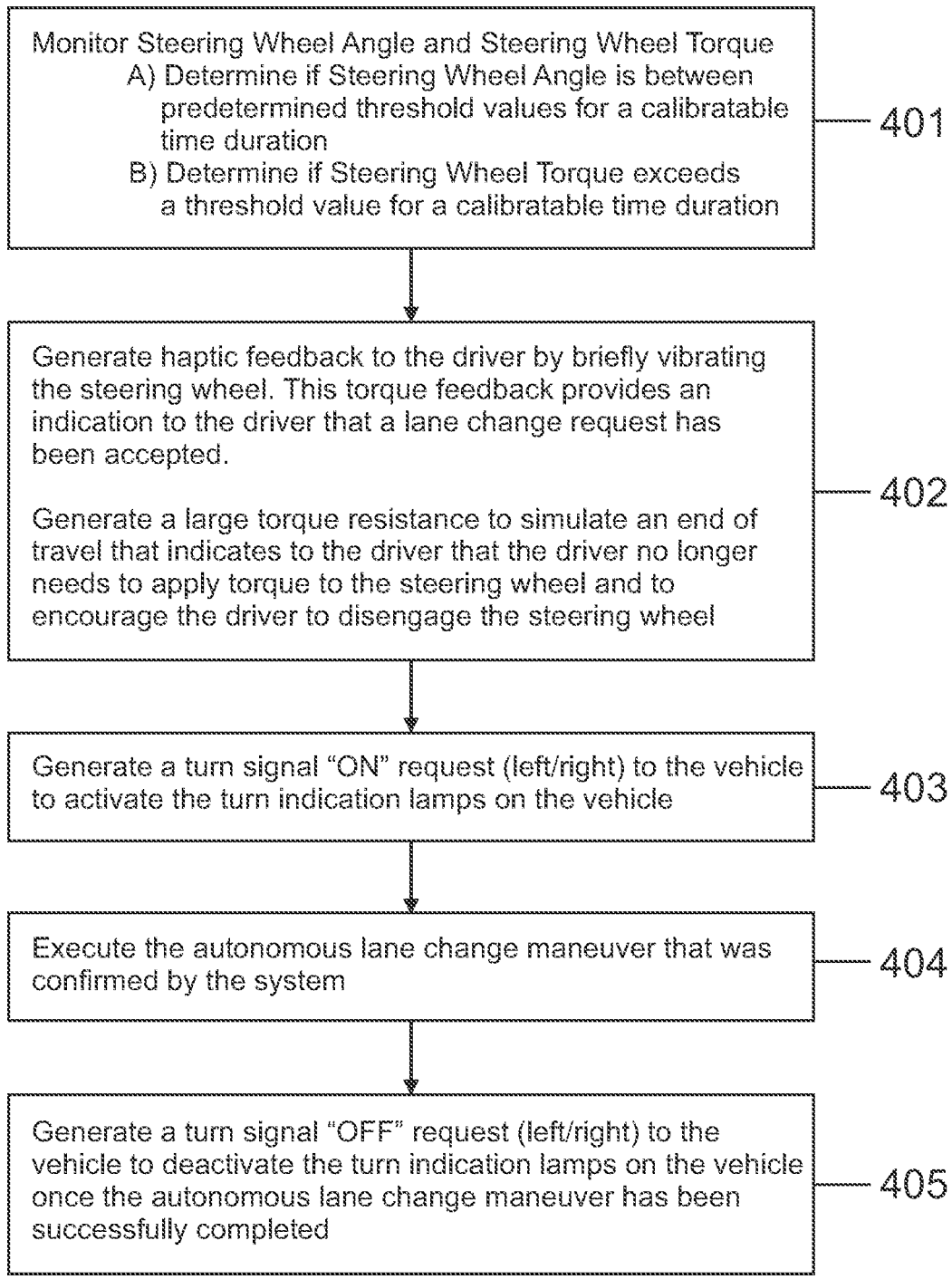
FIG. 4 depicts an illustrative variation in which a flowchart represents an algorithm for an automated steering system handling a steering maneuver request by a driver.

Referring to FIG. 4, an illustrative variation is represented by a flow chart. In this illustrative variation, it is assumed that a vehicle is engaged in autonomous highway driving, and that the steering interface is a steering wheel that is being held at a straight-ahead location by the autonomous steering system, and that the driver has requested to initiate an autonomous lane change maneuver. It is also assumed in this illustrative variation the steering interface used by the driver is a steering wheel. In a first step 401 the system monitors the steering wheel angle and steering wheel torque and determines whether a) the steering wheel is being held between an upper steering wheel angle threshold and a lower steering wheel angle threshold; and, b) whether the steering wheel torque exceeds a steering wheel torque threshold for a calibratable, predetermined time duration. In a second step 402, the autonomous steering system may generate a haptic feedback for the driver by briefly vibrating the steering wheel as an indication to the driver that a lane change request has been accepted. The steering wheel may also generate a large torque resistance to simulate an end of wheel travel that indicates to the driver that the driver no longer needs to hold the steering wheel in the current position. In a third step 403, the autonomous steering system may activate a left or right turn signal lamp or lane change lamp, or caused it to be activated. In a fourth step 404, the autonomous steering system executes the autonomous lane change. In a fifth step 405, the autonomous steering system may turn off the left or right turn signal lamp or lane change lamp, or cause it to be turned off, after the autonomous lane change maneuver has been successfully completed.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may comprise a method comprising: providing a vehicle comprising an autonomous steering system and at least one steering interface; using the autonomous steering system to accept steering input from a driver via at least one of the at least one steering interface; using the autonomous steering system to interpret the driver input as a request by the driver for the autonomous steering system to perform a particular autonomous steering maneuver; and, using the autonomous steering system to induce the vehicle to perform the autonomous steering maneuver.

Variation 2 may comprise the method of variation 1 and any number or combination of variations 3-20 wherein at least one of the at least one steering interface is a steering wheel.

Variation 3 may include the method of variation 1 and any number or combination of variations 2 and 4-20 wherein using the autonomous steering system to interpret the driver input as a request by the driver for the autonomous steering system to perform a particular autonomous steering maneuver comprises using the autonomous steering system to recognize that the steering interface is being manipulated in a particular, predetermined manner.

Variation 4 may include the method of variation 3 and any number or combination of variations 2 and 5-20 wherein using the autonomous steering system to recognize that the steering interface is being manipulated in a particular, predetermined manner comprises using the autonomous steering system to detect that the steering interface is being held between a first tolerance and a second tolerance for a predetermined amount of time.

Variations 5 may include the method of variation 4 and any number or combination of variations 2 and 6-20 wherein the steering interface is a steering wheel and wherein the first tolerance is a first steering wheel angle tolerance and the second tolerance is a second steering wheel angle tolerance.

Variation 6 may include the method of variation 3 and any number or combination of variations 2, 4, 5, and 7-20 wherein using the autonomous steering system to recognize that the steering interface is being manipulated in a particular, predetermined manner comprises using the autonomous steering system to detect that the steering interface is being manipulated with a certain intensity.

Variation 7 may include the method of variation 6 and any number or combination of variations 2, 4, 5, and 8-20 wherein using the autonomous steering system to detect that the steering interface is being manipulated with a certain intensity comprises using the autonomous steering system to detect a particular torque being applied to the steering interface.

Variation 8 may include the method of variation 6 and any number or combination of variations 2, 4, 5, 7, and 9-20 wherein using the autonomous steering system to detect that the steering interface is being manipulated with a certain intensity comprises using the autonomous steering system to detect a that the steering interface is being manipulated at a particular rate of change.

Variation 9 may include the method of variation 1 and any number or combination of variations 2-8 and 10-20 further comprising delivering feedback to the driver after the autonomous steering system is used to interpret the driver input as a request by the driver for the autonomous steering system to perform a particular autonomous steering maneuver Variation 10 may include the method of variation 9 and any number or combination of variations 2-8 and 11-20 wherein delivering feedback to the driver after the autonomous steering system is used to interpret the driver input as a request by the driver for the autonomous steering system to perform a particular autonomous steering maneuver comprises delivering haptic feedback.

Variation 11 may include the method of variation 10 and any number or combination of variations 2-8 and 12-20 wherein delivering haptic feedback comprises vibrating at least one of the at least one steering interface.

Variation 12 may include the method of variation 10 and any number or combination of variations 2-8 and 13-20 wherein delivering haptic feedback comprises inducing torque feedback in at least one of the at least steering interface.

Variation 13 may include the method of variation 9 and any number or combination of variations 2-8, 10-12, and 14-20 wherein delivering feedback to the driver after the autonomous steering system is used to interpret the driver input as a request by the driver for the autonomous steering system to perform a particular autonomous steering maneuver comprises delivering audio feedback.

Variation 14 may include the method of variation 9 and any number or combination of variations 2-8, 10-13, and 15-20 wherein delivering feedback to the driver after the autonomous steering system is used to interpret the driver input as a request by the driver for the autonomous steering system to perform a particular autonomous steering maneuver comprises delivering visual feedback.

Variation 15 may include the method of variation 14 and any number or combination of variations 2-8, 10-13, and 16-20 wherein the visual feedback comprises illuminating a heads-up light.

Variation 16 may include the method of variation 14 and any number or combination of variations 2-8, 10-13, 15, and 17-20 wherein the visual feedback comprises updating a display.

Variation 17 may include the method of variation 1 and any number or combination of variations 2-16 and 18-20 wherein at least one of the at least one steering interface is a button dedicated to a particular steering maneuver; and,
wherein using the autonomous steering system to interpret the driver input as a request by the driver for the autonomous steering system to perform a particular autonomous steering maneuver comprises using the autonomous steering system to recognize that a steering maneuver request has been requested via a pressing of the button dedicated to the particular steering maneuver.

Variation 18 may include the method of variation 17 and any number or combination of variations 2-16, 19, and 20 wherein the button dedicated to the particular steering maneuver is digitally displayed on a surface.

Variation 19 may include the method of variation 1 and any number or combination of variations 2-18 and 20 wherein at least one of the at least one steering interface is an interface for accepting and interpreting voice commands; and,
wherein using the autonomous steering system to interpret the driver input as a request by the driver for the autonomous steering system to perform a particular autonomous steering maneuver comprises utilizing the interface for accepting and interpreting voice commands to accept and interpret a vocal steering maneuver request by the driver.

Variation 20 may include the method of variation 19 wherein the interface for accepting and interpreting voice commands comprises a microphone.

The above description of select variations within the scope of the invention is merely illustrative in nature and, thus, variations or variants thereof are not to be regarded as a departure from the spirit and scope of the invention.

What is claimed is:

1. A method comprising:
providing a vehicle comprising an autonomous steering system and at least one steering interface;
using the autonomous steering system to accept steering input from a driver via at least one of the at least one steering interface;
using the autonomous steering system to interpret the driver input as a request by the driver for the autonomous steering system to perform a particular autonomous steering maneuver; and,
using the autonomous steering system to induce the vehicle to perform the autonomous steering maneuver;
wherein using the autonomous steering system to interpret the driver input as a request by the driver for the autonomous steering system to perform a particular autonomous steering maneuver comprises using the autonomous steering system to recognize that the steering interface is being manipulated in a particular, predetermined manner; wherein using the autonomous steering system to recognize that the steering interface is being manipulated in a particular, predetermined manner comprises using the autonomous steering system to detect that the steering interface is being held between a first tolerance and a second tolerance for a predetermined amount of time,
wherein at least one of the at least one steering interface is a button dedicated to a particular steering maneuver; and,
wherein using the autonomous steering system to interpret the driver input as a request by the driver for the autonomous steering system to perform a particular autonomous steering maneuver comprises using the autonomous steering system to recognize that a steering maneuver request has been requested via a pressing of the button dedicated to the particular steering maneuver.

2. The method of claim 1 wherein the button dedicated to the particular steering maneuver is digitally displayed on a surface.

3. A method comprising:
providing a vehicle comprising an autonomous steering system and at least one steering interface;
using the autonomous steering system to accept steering input from a driver via at least one of the at least one steering interface;
using the autonomous steering system to interpret the driver input as a request by the driver for the autonomous steering system to perform a particular autonomous steering maneuver; and,
using the autonomous steering system to induce the vehicle to perform the autonomous steering maneuver;
wherein using the autonomous steering system to interpret the driver input as a request by the driver for the autonomous steering system to perform a particular autonomous steering maneuver comprises using the autonomous steering system to recognize that the steering interface is being manipulated in a particular, predetermined manner; wherein using the autonomous steering system to recognize that the steering interface is being manipulated in a particular, predetermined manner comprises using the autonomous steering system to detect that the steering interface is being held between a first tolerance and a second tolerance for a predetermined amount of time, wherein at least one of the at least one steering interface is an interface for accepting and interpreting voice commands; and, wherein using the autonomous steering system to interpret the driver input as a request by the driver for the autonomous steering system to perform a particular autonomous steering maneuver comprises utilizing the interface for accepting and interpreting voice commands to accept and interpret a vocal steering maneuver request by the driver.

4. The method of claim 3 wherein the interface for accepting and interpreting voice commands comprises a microphone.

\* \* \* \* \*